United States Patent [19]

Warnez

[11] 4,303,444
[45] Dec. 1, 1981

[54] METHOD FOR INHIBITING BENZENE FORMATION IN ANTIFOULING PAINTS

[75] Inventor: Michel Y. Warnez, Copenhagen, Denmark

[73] Assignee: M&T Chemicals Inc., Woodbridge, N.J.

[21] Appl. No.: 148,126

[22] Filed: May 9, 1980

[30] Foreign Application Priority Data

May 10, 1979 [DK] Denmark ............................... 1957/79

[51] Int. Cl.$^3$ .............................................. C09D 5/14
[52] U.S. Cl. ................................... 106/16; 106/18.35; 106/241; 424/288
[58] Field of Search ...................... 424/288; 106/15.05, 106/16, 17, 18, 18.35, 241

[56] References Cited

U.S. PATENT DOCUMENTS

| | | | |
|---|---|---|---|
| 3,615,744 | 10/1971 | Yokoo et al. | 106/16 |
| 3,639,583 | 2/1972 | Cardarelli et al. | 106/18.35 |
| 4,021,392 | 5/1977 | Milne et al. | 106/18.35 |
| 4,191,579 | 3/1980 | Hails et al. | 106/15.05 |

*Primary Examiner*—Lorenzo B. Hayes
*Attorney, Agent, or Firm*—Stanley A. Marcus; Donald G. Marion

[57] ABSTRACT

A method for inhibiting benzene formation in rosin-based antifouling paints which involves adding trialkyl tin oxide or hydroxide to the paints.

7 Claims, No Drawings

METHOD FOR INHIBITING BENZENE FORMATION IN ANTIFOULING PAINTS

It has recently been found that certain anti-fouling paint compositions comprising triphenyltin fluoride have a high content of free benzene. Various national regulations contain different requirements with respect to the maximum permissible content of free benzene in paint compositions, and, for example, Danish requirements say that the maximum permissible content of free benzene in the volatile components of the paint is 0.2% by weight.

A typical composition of a paint which was found to contain an unacceptably high content of free benzene is the following:

| Component | Percent by weight |
|---|---|
| Triphenyltin fluoride | 11.1 |
| Gum rosin | 8.0 |
| Bis (tributyltin) oxide | 2.2 |
| Solvents | 35.4 |
| Zinc oxide | 22.0 |
| Other Pigments[1] | 10.5 |
| Binder[2] | 8.8 |
| Additives[3] | 2 |
| | 100.0 |

[1] calcium carbonate, copper phthalocyanine blue, Indanthrone blue, carbon black.
[2] vinyl chloride/vinyl acetate/vinyl alcohol copolymer, tritotylphosphate.
[3] antisettling and wetting agents.

The amount of benzene in the above paint composition, based upon the solvents, was between 1.8 and 2.7% by weight, depending upon production and/or storage conditions.

The solvents used in the preparation of the above composition typically contained less than 0.2% by weight of benzene, and, hence, could not contribute to the unacceptably high content of free benzene in the composition.

As a result of a comprehensive study, it has now been found that the benzene formation is due to reaction between the triphenyltin fluoride and the gum rosin under the conditions of production and/or storage, the benzene formation being the greater, the higher the temperature to which the components and the composition have been exposed.

Further, according to the invention, it was found that the formation of benzene could be minimized by adding bis (tributyltin) oxide until the amount thereof is substantially stoichiometric with respect to the content of carboxylic acid groups in the gum rosin.

Based upon these findings, it is believed that the formation of free benzene is due to the action of the carboxylic acid groups of the gum rosin on the triphenyltin fluoride.

Gum rosin is a natural product of varying composition. Typically, it contains 65–80% by weight of abietic acid and 5–10% of neutral substances, the balance being other rosin acids of similar structure as abietic acid.

While the exact mechanismm of the reaction between the gum rosin and the triphenyltin fluoride has not yet been established, it is believed that at least one of the phenyl groups in the triphenyltin fluoride is replaced by the abietic acid carboxylate group, R—COO—.

In addition to the formation of the unacceptably high concentration of free benzene in the final paint composition, the above reaction with gum rosin also has the undesired effect of deteriorating the anti-fouling properties of the paint composition due to the chemical modification of the triphenyltin fluoride molecule.

It is believed that the above findings can be generalized to the extent that the exact identity of the group R in the carboxylate group is not particularly critical to the liberation of benzene from the phenyltin compound, and also to the extent that the exact identity of the phenyltin compound is not critical. Hence, it is contemplated that also tetraphenyltin and di- and monophenyltin compounds could be attacked by carboxylate groups in similar manner as stated above.

Hence, the measures to be taken to avoid the above-explained deterioration of the phenyltin compound by carboxylate groups will, quite generally, comprise measures to bind, in a competing reaction, any carboxylate groups which might otherwise be available for reaction with the phenyltin compound. In addition to the above-mentioned bis (tributyltin) oxide, it is contemplated that also other basic non-aromatic organo-metal oxides will be preferentially attacked by available carboxylate groups in the paint compositions so as to protect the phenyltin compound from attack by carboxylate groups.

The present invention, therefore, relates to a carboxylate group-containing paint composition comprising a phenyltin compound, the said paint composition being characterized in that it comprises a basic non-aromatic organometal oxide or hydroxide in about the stoichiometric amount, that is, in an amount of at least 75% of the stoichiometric amount, relative to carboxylate groups contained in the composition and otherwise available for reaction with the phenyltin compound.

Suitable basic non-aromatic organometal oxides could be represented by the formula $(R_3M)_2O$ and suitable basic non-aromatic organometal hydroxides by the formula $R_3MOH$, in which R is a non-aromatic organic group, typically an alkyl group having up to 12 carbon atoms, in particular up to 4 carbon atoms, preferably having 4 carbon atoms, and M is a metal, typically tin.

In the present context, the term "carboxylate groups" is intended to designate both carboxylic acid groups, —COOH, and forms thereof which are sufficiently loosely bound so as to still be available for reaction with the phenyltin compound, for example, carboxylic acid groups present as salts which may, under the conditions prevailing in the composition during the preparation and/or storage of the paint composition, be or become capable of reaction with the phenyltin compound.

As appears from the paint composition given above, it is known to have gum rosin and a basic non-aromatic organo-metal oxide, as exemplified by bis (tributyltin) oxide, present together in a paint composition, but the known paint compositions containing this combination do not contain the basic non-aromatic organometal oxide in an amount approaching the stoichiometric amount relative to carboxylate groups in the gum rosin or other carboxylate-containing material; the conventional content of the non-aromatic basic organometal oxide is about 25% of the stoichiometric amount relative to the carboxylate group content, or less. In contrast, according to the invention, it is attempted to have at least almost the stoichiometric amount of the basic non-aromatic organometal oxide relative to the carboxylate groups otherwise available for the reaction with the phenyltin compound, and in prefered compositions of the invention, the basic non-aromatic organometal oxide or hydroxide will be present in an amount of 90–125%, preferably 95–105% of the stoichiometric amount relative to carboxylate groups otherwise available for reaction with the phenyltin compound. While it would in principle be possible to employ a larger excess of the basic non-aromatic organometal oxide than the above-mentioned 125% of the stoichiometric amount, this would not be economical, and also, it is believed that under certain circumstances, especially when no added water scavenger is present (vide below), a larger excess of the basic non-aromatic organometal oxide may even result in a greater benzene formation than the stoichiometric amount.

The reaction between the basic non-aromatic organometal oxide and carboxylate groups proceeds with liberation of water, and it has been found that when a water scavenger is present in the paint compositions in an amount effective to bind the reaction water (plus any additional water introduced with the raw materials), this has a favourable effect with respect to lowering the amount of free benzene in the final paint compositions.

While bis (tributyltin) oxide has been found to function excellently, it is believed that other non-aromatic basic organometal oxides which will lead to good results with respect to low benzene formation, are other basic alkyltin oxides or hydroxides, especially bis (trialkyltin) oxides, and preferably bis (tri-lower alkyltin) oxides, but bis (tri-butyltin) oxide is preferred because of its commercial availability and acknowledged tolerability.

In the final paint composition of the invention, the basic non-aromatic organometal oxide, or the predominant proportion thereof, is believed to be present in the form of the reaction product thereof with the carboxylate-containing component or components, and it has been found that in the case of bis (tributyltin) oxide and gum rosin, equally good results, with respect to low benzene formation, are obtained when addition of these two components separately is replaced with addition of their reaction product, known as tributyltin resinate, in the corresponding amount.

The most typical paints containing phenyltin compounds and gum rosin are anti-fouling paints in which the gum rosin serves as a leaching aid establishing cavities in the paint matrix, the so-called honeycomb structure, the formation of which contributes to the continuous release of the bioactive material. It has been found that the reaction product between bis (tributyltin) oxide and gum rosin, known as tributyltin resinate, has a similar function in an anti-fouling paint, which means that this compound, whether formed in situ from added gum rosin and added bis (tributyltin) oxide, or added in the form of the reaction product, will not impair the leaching properties of the anti-fouling paint.

The paint composition of the present invention is prepared in accordance with conventional methods for preparing paint compositions. Conventional binders may be used, such as vinyl resins, acrylic resins, or chlorinated rubber resins. The solvents may be, for example, aromatics, aliphatics, ketones, esters, including glycol esters, and glycol ether esters. Preferred pigments are zinc oxide, calcite, talc, colouring pigments such as red or yellow iron oxide, and metalorganic pigments such as phthalocyanine blue and green. Thixotropic agents such as Bentone ® and Aerosil ® may be added.

The preferred procedure for preparing the paint composition of the invention, e.g., a composition corresponding to the composition stated on page 1 of the present specification, but containing 10.2 percent by weight of the stoichiometric mixture of gum rosin and bis (tributyltin) oxide, is as follows:

In order to obtain the best inhibition of the benzene formation caused by the carboxylate groups in the gum rosin, the gum rosin and a stoichiometric amount of bis (tributyltin) oxide are preferably mixed with each other and with the water scavenger in a solvent such as toluene, with stirring at room temperature, until the reaction is completed, preferably over night. The resulting solution may thereafter be charged into a ball mill together with part of the binder, the pigments, and part of the solvents, and milled until the fineness of grind is satisfactory, preferably less than 20 microns, as determined by Hegmann Gauge. Thereafter, the charge in the ball mill is let down with the remainder of the binder and the solvents to form the final paint. Alternatively, the solution containing the reaction product is charged into a high-speed dissolver together with the pigments, part of the binder, and part of the solvents, and the grinding down to the desired fineness is performed either in the high-speed dissolver or on a three-roller-mill, whereafter completion of the paint takes place by addition of the remainder of the binder and the solvent.

Alternatively, the solution of the reaction product can be added after grinding of the other components, in which case it may be advantageous to add part of the water scavenger to the grinding base.

The maximum temperature during the above production stages is 60° C.

EXAMPLES

Various model compositions were made and subjected to various conditions, as stated in the below table:

TABLE.

| Example | 1 | 2 | 3 | 4 | 5 | 6 | 7 | 8 | 9 | 10 | 11 | 12 | 13 | 14 |
| --- | --- | --- | --- | --- | --- | --- | --- | --- | --- | --- | --- | --- | --- | --- |
| Components (g) | | | | | | | | | | | | | | |
| Toluene | 50 | 50 | 50 | 50 | 50 | 50 | 50 | 50 | 50 | 50 | 50 | 50 | 50 | 50 |
| Triphenyltin fluoride | 5.55 | 5.55 | 5.55 | 5.55 | 5.55 | 5.55 | 5.55 | 5.55 | 5.55 | 5.55 | 5.55 | 5.55 | 5.55 | 5.55 |
| Gum rosin | | 4.55 | 4.55 | 4.55 | 4.0 | 4.55 | 4.55 | | 4.55 | 4.55 | | | 4 | 4 |
| Bis (tributyltin) oxide | | | | | 1.1 | 4.5 | 8.9 | | | | | | | |
| Tributyltin resinate | | | | | | | | 8.9 | | | 8.9 | 8.9 | | |
| Water | | | | | | | | | 0.3 | | 0.3 | | | |
| Water scavenger[1] | | | | | | | | | | 5 | | 5 | | |
| Zinc oxide | | | | | | | | | | | | | | 11 |
| Test conditions[2] | | | | | | | | | | | | | | |
| Temperature (° C.) | 60 | 20 | 40 | 60 | 60 | 60 | 60 | 60 | 60 | 60 | 60 | 60 | 60 | 60 |
| for time (hours) | 168 | 120 | 120 | 120 | 168 | 120 | 120 | 120 | 120 | 120 | 120 | 120 | 168 | 168 |
| Benzene formed[3] | 0.00 | 0.07 | 0.15 | 0.74 | 0.54 | 0.05 | 0.38 | 0.05 | 1.09 | 0.52 | 0.10 | 0.01 | 0.98 | 0.66 |

TABLE.-continued

| Example | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| (g) | | | | | | | | | | | | | | |

[1]"Zusatzmittel OF" (BAYER)
[2]Glass tubes - frequent shaking
[3]Estimation of the accuracy: ± 0.02 g It appears from Example 1 that when no gum rosin is present, there is no benzene formation at all. Examples 2–4 show the dramatic effect of the temperature when gum rosin is present; while there is very low benzene formation at 20° C. and 40° C. for 120 hours under laboratory conditions, there is a dramatic rise in benzene formation at 60° C. The exposure to 60° C. for 120 hours under laboratory conditions is a realistic simulation of production and storage conditions to be encountered in practice. Examples 5–7 show how the benzene formation is minimized at the stoichiometric relation between gum rosin and bis (tributyltin) oxide (2 mols of gum rosin + 1 mol of bis (tributyltin) oxide = 2 mols of reaction product, known as tributyltin resinate, +1 mol of water; the molecular weight of abietic acid is 302, and the molecular weight of bis (tributyltin) oxide is 596). It is especially noteworthy that the conventional low amount of bis (tributyltin) oxide does not reduce the benzene content to acceptable levels, and that there is no improvement, but a considerably increased benzene production, when the bis (tributyltin) oxide is used in twice the stoichiometric amount. Example 8 shows that addition of the reaction product between gum rosin and bis (tributyltin) oxide has the same effect as addition of the two reactants separately in the corresponding proportion (cf. Example 6). The effect of water and a water scavenger on the system without the bis (tributyltin) oxide appears from Examples 9 and 10. Example 9, as compared to Example 4, shows the adverse effect of the presence of water, and Example 10, as compared to Example 4, shows the beneficial effect of the presence of a water scavenger. The same effect, but much more pronounced, is noted from Examples 11 and 12 as compared to Example 8. It is evident that although the presence of the water does not increase the benzene formation to unacceptable levels in Example 11, the presence of a water scavenger in Example 12 results in a dramatic decrease in the benzene content and shows the beneficial effect of the water scavenger combined with the neutralization of the carboxylate groups. In this connection it should be noted that the increased benzene formation in Example 7 may be due to greater availability of water in the dissolved phase (due to formation of hydrates with bis (tributyltin) oxide), and that this effect may be avoidable by means of a water scavenger. Examples 13 and 14 show that although zinc oxide is a basic compound, it does not yield any significant improvement with respect to reducing the benzene content to acceptable levels.

I claim:

1. A method for inhibiting the formation of benzene in an antifouling paint composition comprising gum rosin and a triphenyltin compound comprising the step of adding to the composition a basic trialkyltin oxide or hydroxide in at least 75% of the stoichiometric amount relative to the carboxylic acid groups in said rosin.

2. A method according to claim 1, in which the basic trialkyl tin oxide or hydroxide is present in 90–125% of the stoichiometric amount relative to carboxylic groups contained in the rosin.

3. A method according to claim 1, in which the triphenyltin compound is triphenyltin fluoride.

4. A method according to claim 1, in which the basic trialkyltin oxide or hydroxide is a bis (tri-lower alkyltin) oxide.

5. A method according to claim 4, wherein the bis (tri-lower alkyltin) oxide is bis (tributyltin) oxide.

6. A method according to claim 1, which additionally comprises an effective amount of a water scavenger.

7. A method according to claim 1, in which the weight ratio between gum rosin and bis (tributyltin) oxide is 1:0.95–1.05.

* * * * *